(12) United States Patent
Patterson et al.

(10) Patent No.: US 7,383,379 B2
(45) Date of Patent: Jun. 3, 2008

(54) MANIPULATING DATA IN A DATA STORAGE DEVICE USING AN AUXILIARY MEMORY DEVICE

(75) Inventors: Brian L Patterson, Boise, ID (US); Jonathan Condel, Boise, ID (US); Bryan Diamond, Meridain, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 650 days.

(21) Appl. No.: 10/214,685

(22) Filed: Aug. 7, 2002

(65) Prior Publication Data

US 2004/0030831 A1  Feb. 12, 2004

(51) Int. Cl.
*G06F 12/00* (2006.01)

(52) U.S. Cl. ............... 711/114; 711/170; 711/165; 714/6; 714/7

(58) Field of Classification Search ............ 711/4, 711/104, 113, 114, 170–173; 714/6, 7
See application file for complete search history.

(56) References Cited

U.S. PATENT DOCUMENTS

| 5,809,224 | A | * | 9/1998 | Schultz et al. | 714/7 |
| 5,960,169 | A | * | 9/1999 | Styczinski | 714/6 |
| 6,347,359 | B1 | * | 2/2002 | Smith et al. | 711/114 |
| 6,378,038 | B1 | * | 4/2002 | Richardson et al. | 711/114 |

* cited by examiner

*Primary Examiner*—Jasmine Song

(57) ABSTRACT

A data storage device having, for example, a disk array comprising a plurality of independent disks, an array controller for controlling the array and an auxiliary memory device connected to the disk array and array controller for temporarily storing data being moved within the array or being changed from a first data storage type to a second data storage type within the array.

21 Claims, 6 Drawing Sheets

|  | disk 1 | disk 2 | disk 3 | disk 4 | disk 5 | disk 6 | disk 7 | disk 8 |
|---|---|---|---|---|---|---|---|---|
| RAID 1 Stripe | Data | Parity | Data | Parity | Data | Parity | Data | Parity |
| RAID 1 Stripe | Data | Parity | Data | Parity | Data | Parity | Data | Parity |
| RAID 1 Stripe | Data | Parity | Data | Parity | Data | Parity | Data | Parity |
| RAID 1 Stripe | Data | Parity | Data | Parity | Data | Parity | Data | Parity |
| RAID 1 Stripe | Data | Parity | Data | Parity | Data | Parity | Data | Parity |
| RAID 1 Stripe | Data | Parity | Data | Parity | Data | Parity | Data | Parity |
| RAID 1 Stripe | Data | Parity | Data | Parity | Data | Parity | Data | Parity |
| RAID 5 Stripe | Data | Data | Data | Data | Data | Data | Data | Parity |
| RAID 5 Stripe | Data | Data | Data | Data | Data | Data | Data | Parity |
| RAID 5 Stripe | Data | Data | Data | Data | Data | Data | Data | Parity |
| RAID 5 Stripe | Data | Data | Data | Data | Data | Data | Data | Parity |
| RAID 5 Stripe | Data | Data | Data | Data | Data | Data | Data | Parity |
| RAID 5 Stripe | Data | Data | Data | Data | Data | Data | Data | Parity |
| RAID 5 Stripe | Data | Data | Data | Data | Data | Data | Data | Parity |

Fig. 3

MANIPULATING DATA IN A DATA STORAGE DEVICE USING AN AUXILIARY MEMORY DEVICE

FIELD OF THE INVENTION

The present invention relates to the field of electronic data storage. More particularly, the present invention relates the field of manipulating data in a data storage device using an auxiliary memory device.

BACKGROUND OF THE INVENTION

Computer systems typically include one or more computers, referred to as hosts. Where multiple computers are used, the computers are usually interconnected by a network that allows them to share data. Typically, such networks also include one or more data storage devices to provide additional data storage capacity for the networked computers. A common data storage device is a disk array, also sometimes referred to as a Redundant Array of Independent (or Inexpensive) Disks (RAID). A disk array or RAID is two or more hard drives or similar disks that provide data storage for connected hosts.

Redundant Arrays of Independent (or Inexpensive) Disks are intended to provide storage with better performance and reliability than individual disks. In the pursuit of better performance or better reliability, numerous RAID types have been devised. Each of these RAID types has different reliability and performance characteristics.

For example, one RAID Type-is called Type-1. With a Type-1 RAID, data that is written to one disk is simply mirrored to another, second disk. Thus, data stored in a Type-1 RAID is very reliable because all the data is stored twice and is, therefore, automatically backed up against inadvertent error or corruption.

In a Type-1 disk array with N disks, there are N/2 disks worth of data storage space, and up to N/2 different input or output operations (I/O) can be accommodated at any given time (one I/O per 2 disks in the array). Thus, a Type-1 RAID sacrifices storage capacity to a certain extent in favor of higher reliability and performance.

Another RAID Type-is called Type-5. In Type-5 RAID, one disk's worth of parity information is calculated from the other disks in the array. Parity refers to an integer's property of being odd or even. Parity checking is used to detect and correct errors in binary-coded data, including data stored on a disk array, such as a RAID.

Therefore, in a Type-5 disk array with N disks, there are N-1 disks worth of data storage space. However, when a write command is entered into a Type-5 array, the array must first read from two disks as part of the parity calculation and then write to two disks afterward. As a result, a Type-5 array can only handle about half as many input/output commands in a given amount of time as a Type-1 array. Thus, a Type-5 array has a larger storage capacity for a given number of disks at the sacrifice of some input/output speed.

Given this general information, it becomes apparent that each RAID Type- has its own strengths and weaknesses. A Type-5 array can fit more user data onto a given number of disks than can a Type-1 array. However, a Type-5 array processes input/output commands at a rate only about half that of a Type-1 array.

The strengths and weaknesses of individual RAID types have given rise to the hierarchical storage array. In a hierarchical storage array, data is moved from RAID Type-to RAID Type-based on certain criteria in order to try to obtain more of the strengths and less of the weaknesses than each of the individual RAID types offer by themselves.

For example, consider a hierarchical storage array that could keep a small subset of its data in Type-1 RAID system and the rest of its data in a Type-5 RAID system. If the data in the system is manipulated to ensure that all of the I/Os coming into the system are only going to Type-1 storage, then the array would have the I/O performance of a Type-1 RAID. However, the array has more storage capacity than a typical Type-1 RAID with the same number of disks because data that is not used in an active I/O is transferred to, and kept in, the higher capacity Type-5 portion of the system. The key to this advantage is the data manipulation. Data must be moved from Type-1 storage to Type-5 storage when it is no longer being accessed, and data that is being accessed regularly must be moved to Type-1 storage from Type-5 so that all future accesses will be at the higher I/O rate that a Type-1 RAID provides.

In the current art, the way that data has its RAID type changed is by physically relocating it from one location to another. In other words, each location in the array is designated as being part of the Type-1 system or part of the Type-5 system. A single disk may have both Type-1 and Type-5 locations, but each location on each disk of the array is dedicated to either the Type-1 or the Type-5 system.

When data is to be exchanged from the Type-1 to the Type-5 system, or vice versa, the data is physically moved from a location of the first type to another location within the array of the second type. This strategy works well unless the array is at or near data storage capacity. If the array is full or very close to full, there may be no free location of the second storage type to which data of a first type can be moved. When this occurs, data manipulation must stop and the array can no longer function in a hierarchical fashion providing both Type-1 and Type-5 advantages.

SUMMARY OF THE INVENTION

The present invention provides, in one of many possible embodiments, a data storage device having, for example, a disk array comprising a plurality of independent disks, an array controller for controlling the array, and an auxiliary memory device connected to the disk array and array control for temporarily storing data being moved within the array or being changed from a first data storage type to a second data storage type within the array.

The present invention also provides a method of changing a first set of data in a disk array from a first storage type to a second storage type by copying the data from a first location of the first storage type within the disk array to an auxiliary memory device and copying the data from the auxiliary memory device back to the disk array under the second storage type.

The present invention, in another embodiment, also provides a method of balancing performance of a disk array by copying a first set of data from a first, actively used disk within the array to an auxiliary memory unit, copying a second set of data from a second, less actively used disk within the array, copying the first set of data to the second disk and copying the second set of data to the first disk.

The present invention, in another embodiment, also provides a data storage device having, for example, a data storage device, and an auxiliary memory device connected to the data storage device for temporarily storing data being moved within the data storage device or being changed from a first data storage type to a second data storage type within the data storage device.

Additional advantages and novel features of the invention will be set forth in the description which follows, or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention. The illustrated embodiments are examples of the present invention and do not limit the scope of the invention.

FIG. 3 is a table illustrating the location of data within a disk array and the allocation of portions of the array among different storage types.

Throughout the drawings, identical reference numbers designate similar, but not necessarily identical, elements.

DETAILED DESCRIPTION OF THE PREFERRED EMBODIMENTS

The present invention proposes the use of Random Access Memory (RAM) connected to a hierarchical disk array as a temporary storage location for data that is being transferred from one RAID type of storage to another. This allows a disk array to manipulate data and make changes in the storage type of recorded data regardless of how full the array becomes. Consequently, the full advantages of a hierarchical array can be realized and the strengths of each RAID type can be fully exploited.

More specifically, data that is to be transferred from one RAID type to another is temporarily written into Random Access Memory (RAM) rather than copying it to another location within the disk array, particularly when the disk array is full and would have no other location to accommodate the data. By writing the data to RAM, the location where the data was previously located is freed and that location within the disk array becomes free space that can be reallocated as any desired RAID type. The data can then be rewritten from RAM right back into the location where it was previously located as a new, desired RAID type.

Figure 1:
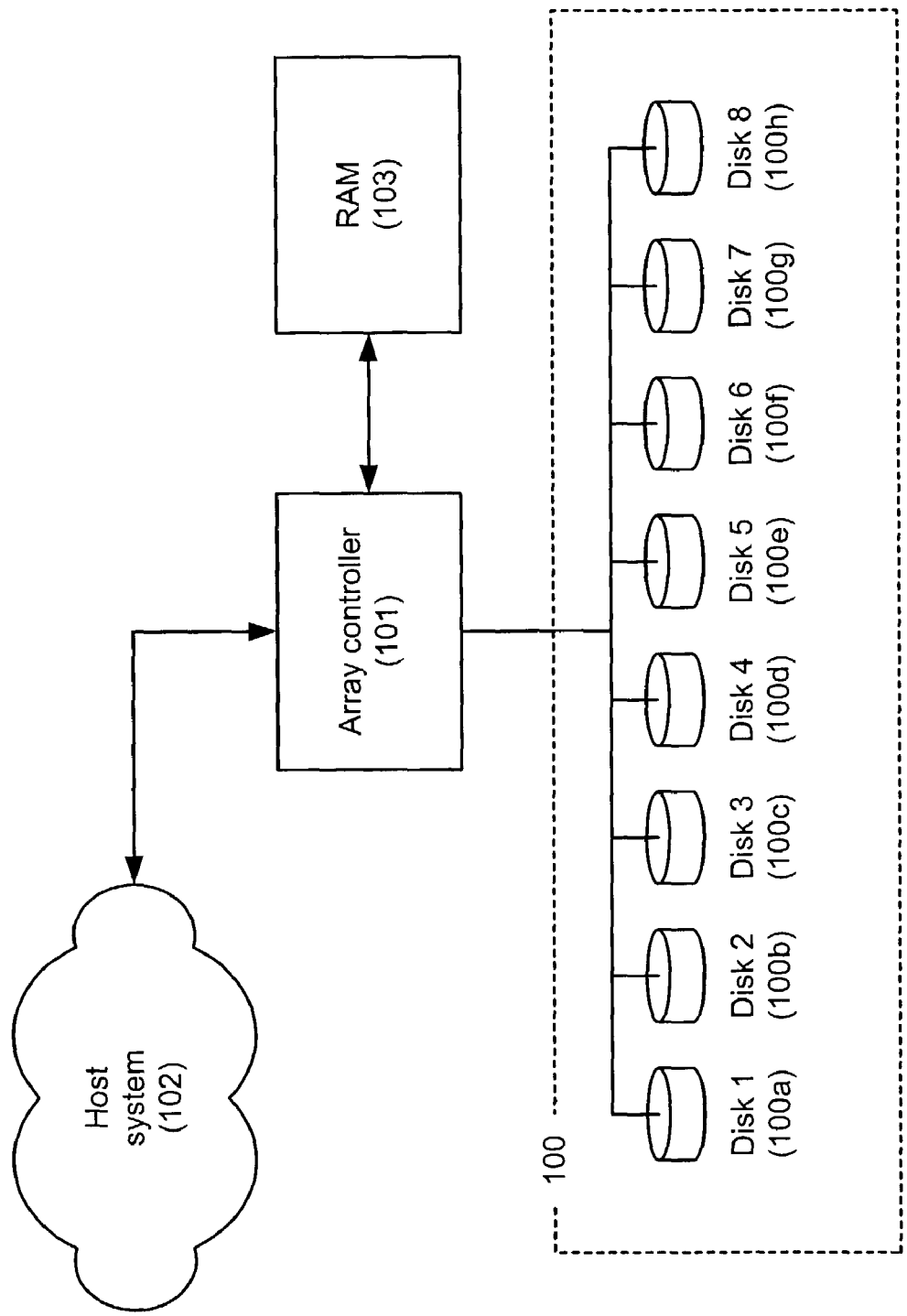
FIG. 1 is a block diagram of a computer system including a RAID and Random Access Memory (RAM) unit according to an embodiment of the present invention.

FIG. 1 is a block diagram of a computer system including a RAID and RAM unit according to an embodiment of the present invention. As shown in FIG. 1, a disk array (RAID) (100) is controlled by an array controller (101). In the embodiment illustrated in FIG. 1, the array (100) consists of eight individual disks (100*a*-100*h*). However, it will be understood by those skilled in the art that an array could potentially contain any number of disks.

The RAID or array (100) in FIG. 1 is preferably a hierarchical array. In a hierarchical array, as described above, different disks (100*a*-100*h*) or portions of different disks (100*a*-100*h*) will be allocated as different storage types, i.e., RAID Type-1 or Type-5. This allows the array (100) to provide the advantages that are characteristic of the multiple storage types.

A host system (102) is connected to the array (100) through the array controller (101). The host system (102), as described above, may be a number of computers, a computer network or multiple computer networks. The host system (102) makes use of the data storage resources of the disk array (100) by providing storage input/output commands to the disk array controller (101).

The system also includes a Random Access Memory (RAM) unit (103). As described above, the RAM unit (103) is used as a temporary holding location for data when the storage type of that data is to be switched from one type to another. As will be appreciated by those skilled in the art, the RAM unit (103) could be replaced by another form of auxiliary memory including, but not limited to, a disk drive, a hard drive, a tape drive, semiconductor memory, etc. Any memory device that can be used to temporarily hold data being moved within the array can be used under principles of the present invention.

Figure 2:
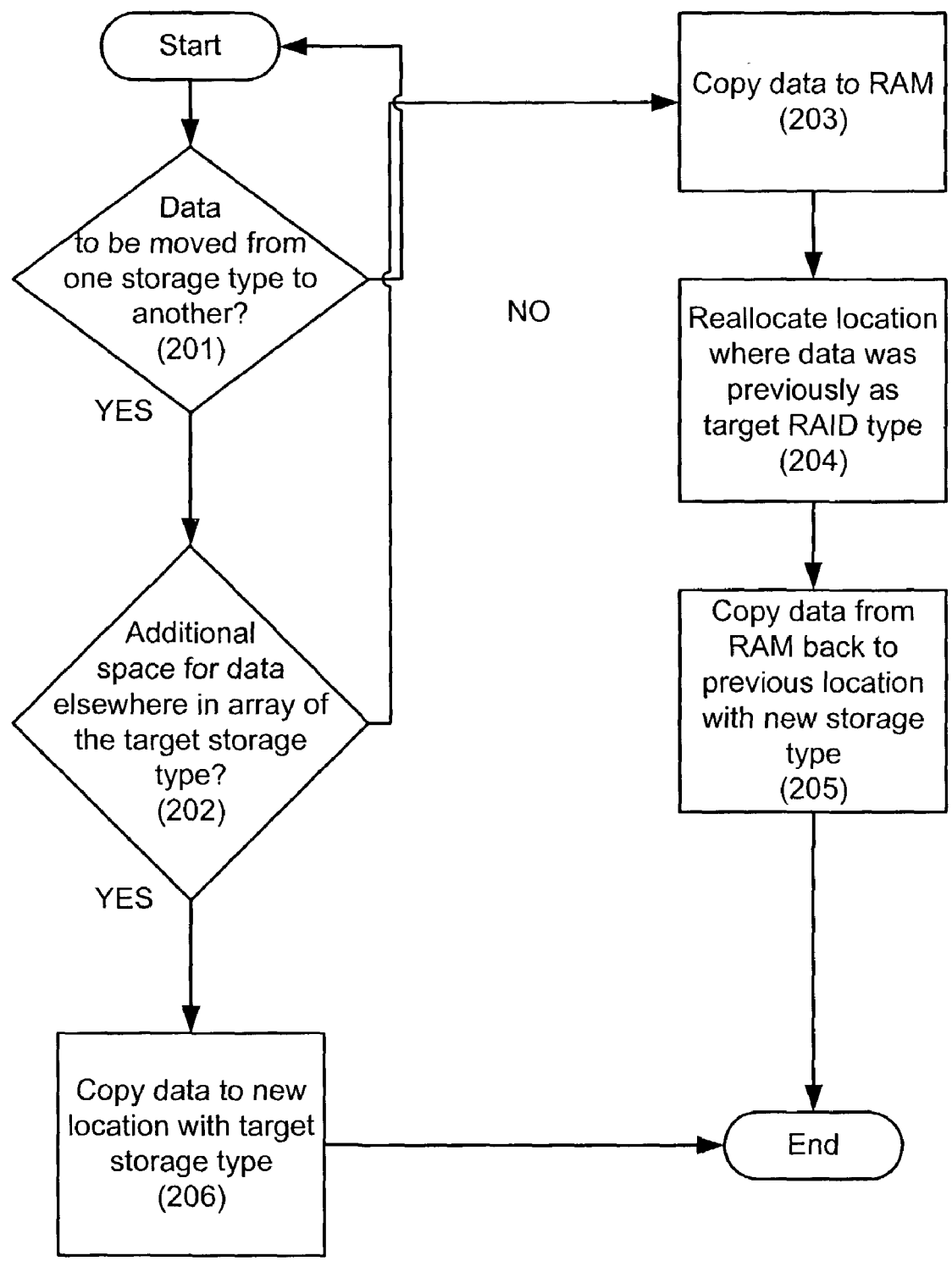
FIG. 2 is a flowchart illustrating the operation of a RAID system according to an embodiment of the present invention.

FIG. 2 is a flow chart illustrating the operation of a RAID system according to an embodiment of the present invention. As shown in FIG. 2, consistent with the explanation above, the operation begins when a set of data stored on the array is to be moved from one type of storage to another. (201). For example, data that is being actively used should be stored as Type-1 data because Type-1 storage provides faster input/output speed. Data that is not actively used can be shifted to Type-5 storage which has the capacity to store more data with less disk space. Thus, when the host system begins using a set of data actively, or ceases using a set of data actively, that data may be shifted appropriately from one storage type to another.

First, the array controller may determine if there is space available in the array of the storage type to which the data should be shifted. (202). If there is space available that is allocated to the type of storage to which the data should be shifted, the data can simply be copied to that available location. (206).

For example, assume a piece of actively used data stored in the Type-1 portion of the RAID. The data is stored in Type-1 storage because it is being repeatedly accessed by the host system. Next, assume that the host system stops actively using that data. The data can then be shifted to Type-5 storage to free the Type-1 storage for data that is coming into active use. If the array controller can identify a location within the array that is already allocated as Type-5 storage and is available, the data can simply be copied from the Type-1 location to the Type-5 location. (206).

However, if the array is at or near storage capacity, there may not be a location of the desired storage type that is available and large enough to accommodate the data being shifted. In this case, the array controller can instead copy the data to RAM (203). This vacates the space where the data was previously held within the array.

The array controller can then reallocate the location where the data was previously held from one storage type to another. (204). For example, if the data was stored in Type-1 storage and, due to lack of use, was to be shifted to Type-5 storage, the data can be copied to RAM and then the location where the data was stored can be reallocated from the Type-1 portion of the RAID to the Type-5 portion of the RAID.

Once the location where the data was previously held is reallocated to the desired storage type, the data can be copied from RAM back to the location where it was previously. (205). However, the data is now stored in that type of storage to which the location was reallocated.

An additional consideration arises when implementing this method, the granularity with which individual RAID types are written. For example, each entire disk in an array may be allocated to a particular type of storage, e.g., Type-1 or Type-5. This is one level of granularity. Alternatively, as mentioned above, portions of a single disk may be allocated to different types of storage. This is another level of granularity.

A "stripe" is a portion of each of the disks in the array that is allocated to the same type of storage. FIG. 3 is a table representing an exemplary array containing eight disks (disk 1-disk 8). Within the eight disks, there are eight stripes of Type-1 storage (301) and eight stripes of Type-5 storage (305). Each stripe includes a portion of each of the eight disks. The table in FIG. 3 illustrates which portions on which disks are used for data storage within each stripe and which portions are used for parity data.

Under principles of the present invention, the granularity with which a particular RAID storage type is written dictates the smallest amount of disk space that can be converted from one RAID storage type to another. For example, if the disks of the array are allocated among the different storage types in stripes, a stripe is the smallest amount of the array that can be reallocated from one type to another. In other words, if an amount of disk space smaller than a stripe needs conversion from one RAID storage type to another, the entire stripe must be converted. Consequently, the conversion of so much memory, much more than is really needed, from the first RAID storage type to the second may make the conversion undesirable.

This situation can also be dealt with, under principles of the present invention, using the RAM unit (103; FIG. 1). Assume that an amount of data less than a full stripe is to be converted from one RAID storage type to another. Rather than simply reallocate the entire stripe in which the data is contained, the system may first look for an amount of data of approximately equal size that is already stored in the second or target RAID storage type. This method will be illustrated in more detail with reference to FIG. 4.

Figure 4:
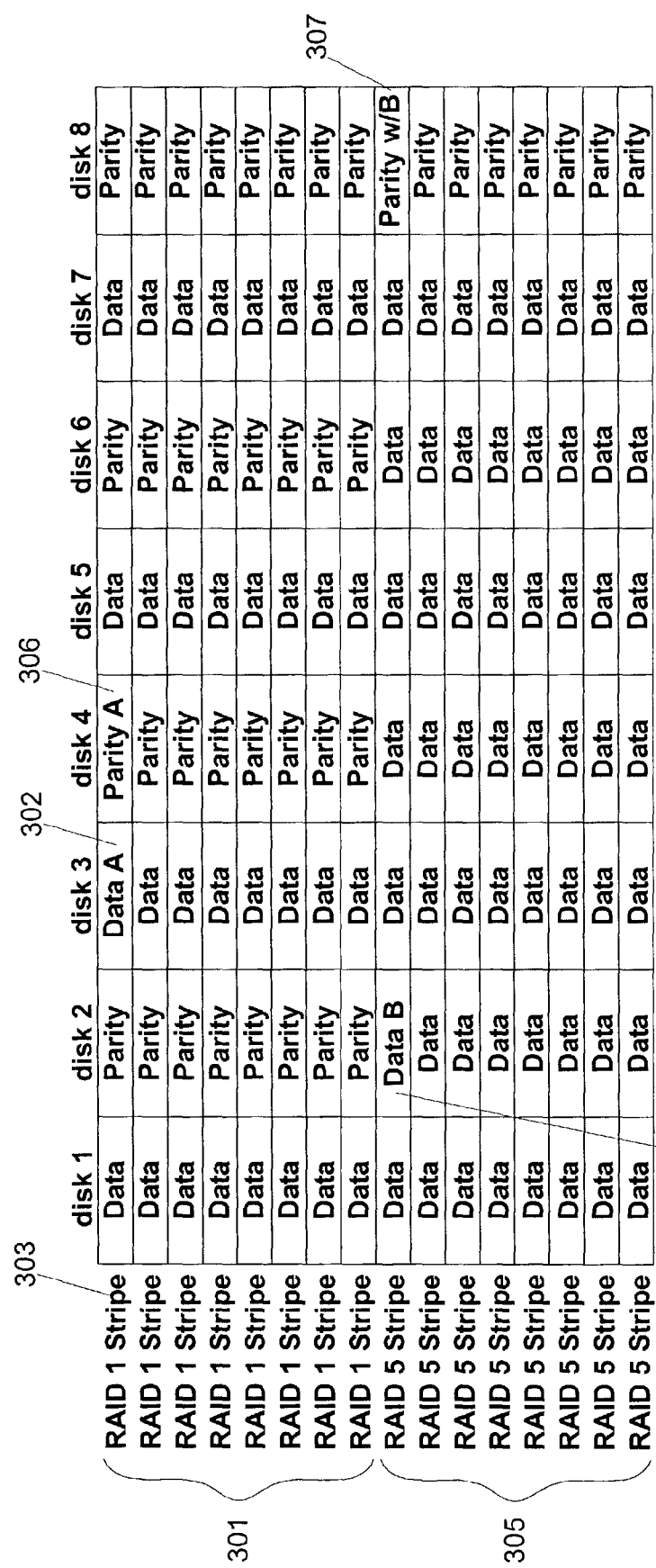
FIG. 4 is a table illustrating the location of data within a disk array that is being manipulated according to principles of the present invention.

In FIG. 4, assume that the data labeled "Data A" (302) is to be converted from Type-1 to Type-5. Data A (302) is contained on disk 3 and represents only a fraction of the data in a stripe (303) of Type-1 storage. Therefore, it would potentially cause performance problems for the other data contained in the stripe (303) if the entire stripe (303) were reallocated from Type-1 to Type-5 for the sake of Data A (302).

Now further assume that it is acceptable if the data labeled "Data B" (304) were converted from RAID Type-5 to RAID Type-1. Further assume that the Data A (302) and data B (304) are of approximately the same size. Given these two assumptions, it becomes possible under principles of the present invention to swap the positions of "Data A" and "Data B" using the RAM unit (103; FIG. 1) instead of changing the storage type of the data stripes in the array.

In this case, for example, both "Data A" (302) and "Data B" (304) would be read into RAM (103; FIG. 1) and their associated slots in disk memory would be deallocated. Next, "Data A" (302) would be written to the space that was previously occupied by "Data B" (304) and "Data B" (304) would be written to the space that was previously occupied by "Data A" (302). Finally, the parities (306, 307) would be adjusted to reflect the new stripe makeup and the operation would be complete.

Figure 5:
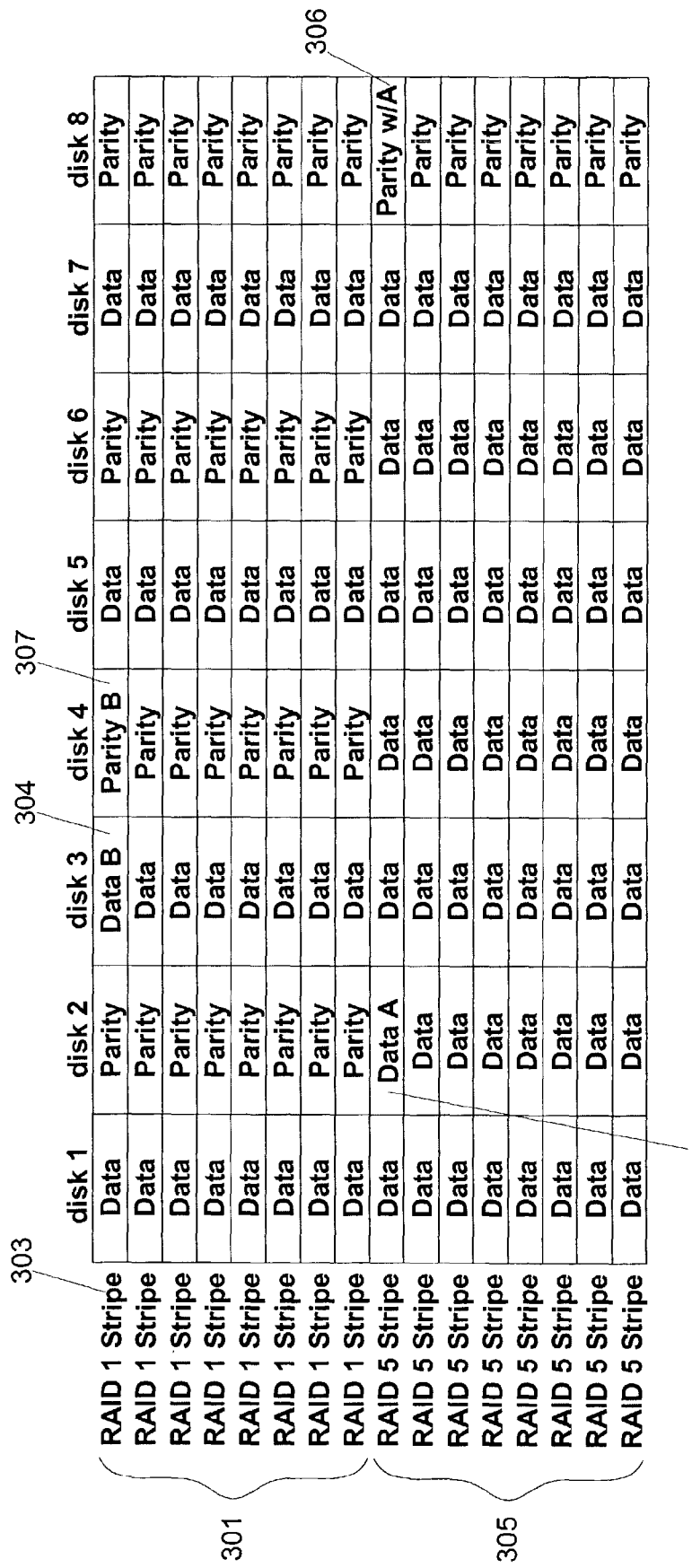
FIG. 5 is a table illustrating the location of data within a disk array that has been manipulated according to principles of the present invention.

The final state of the array after the swap operation is illustrated in FIG. 5. It should be noted that, like the first technique for stripe level RAID Type-conversion, this technique required no additional disk space. Thus, this technique could be done even within an array that was totally allocated.

Figure 6:
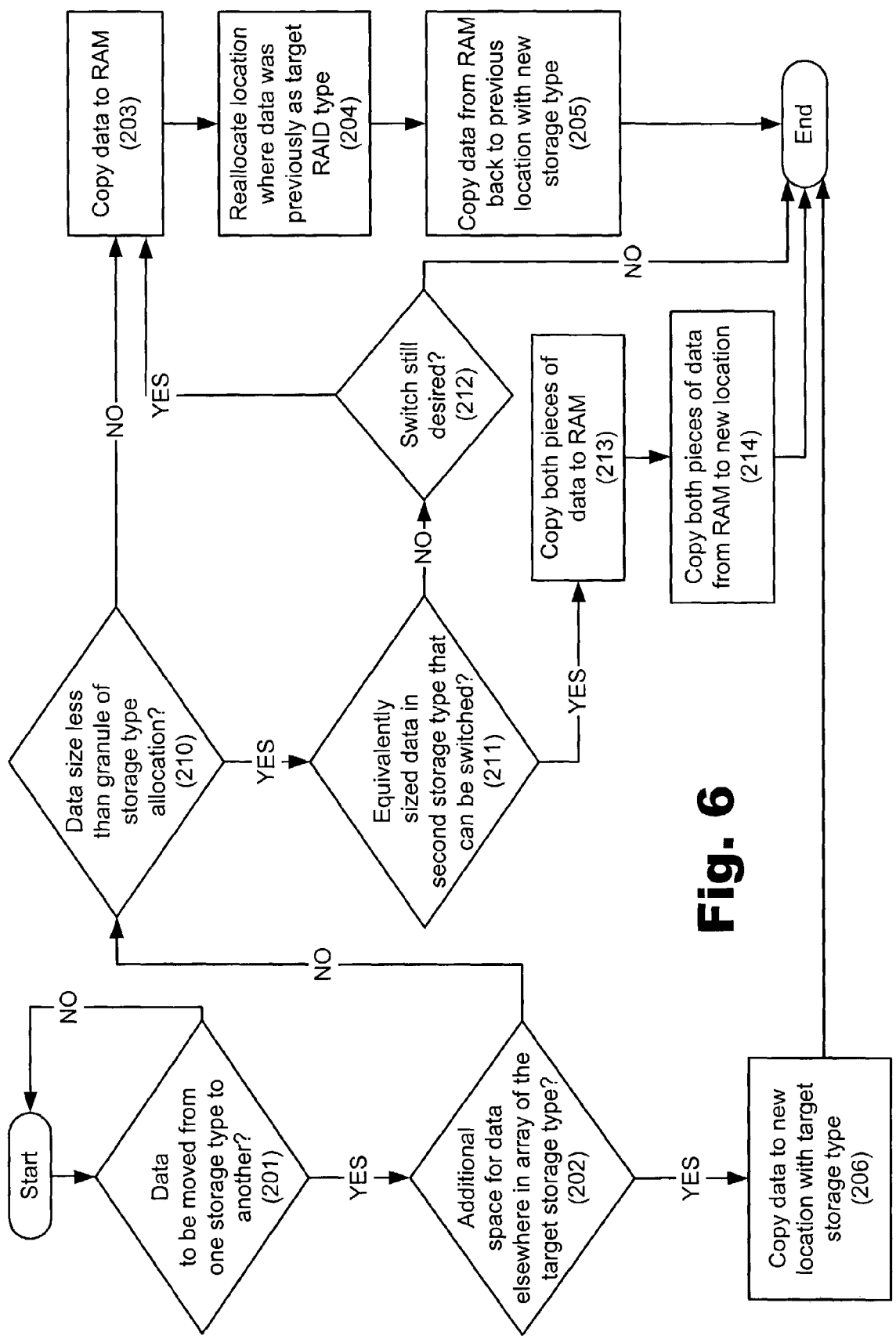
FIG. 6 is a flowchart illustrating the operation of a RAID system according to another embodiment of the present invention.

FIG. 6 illustrates this method as incorporated into the method illustrated in FIG. 2. As shown in FIG. 6, the method begins when data is identified that should be moved from one storage type to another (201), i.e., from a first storage type to a second storage type. If no space is available in the array to simply copy the data to a location allocated to the desired second storage type (202, 206), the method next considers whether the data is of a size less than a granule of storage type allocation, given the granularity with which the array is allocated among different storage types (210).

If the size of the set of data being switched between storage types is larger than a granule (e.g., a full stripe) (210), the method can proceed as outlined above with the data being copied to RAM (203) and its previous location in the array being reallocated to the desired second storage type (204). However, if the set of data being switched between storage types is less than a granule (210), the method looks for an equivalently sized set of data that is already stored in the second storage type and that can be switched to the first storage type (211).

If such a set of data is located, the two pieces of data are swapped. Both pieces of data are copied to RAM. (213). The data is then copied from RAM back to the array, with each set of data being copied to the location formerly occupied by the other set of data. (214). In this way, the storage type of the data is appropriately changed regardless of how full the array may be.

In contrast, the current art for such a swap operation would be to move "Data A" to an unallocated area of disk memory. Then "Data B" would be moved to the location previously occupied by "Data A." Finally, "Data A" would be moved to the location previously occupied by "Data B" and the previously unallocated disk memory would again be unallocated. The problem, as noted above, is that if there is no unallocated disk memory, then this technique cannot work.

Additionally, in this example the data was relocated to convert it from one RAID storage type to another, but this does not have to be the case. This technique could be used any time data needs to be relocated for any reason (whether the RAID storage type is changed or not). As a second example of the present invention, this technique could be used to load balance between disks. In this case, the two pieces of data that would be swapped to move a set of data in active use from an already busy disk and an equally sized set of data from a less busy disk. These two pieces of data might be the same RAID storage type or not. In either case, this technique would work to better load balance the array, even if the array was totally full and no additional disk space was available.

The methods and techniques described herein can be applied to any hierarchical disk array using any storage techniques or media or RAM as well as any RAID types. Furthermore, it will be generalizable to any new form of RAM, disk memory, any new data storage methods, or any new RAID types that are invented in the future.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A data storage device comprising:
   a disk array comprising a plurality of independent disks that include a first location with a first RAID (Redundant Arrays of Independent Disks) type and a second location with a second RAID type;
   an array controller for controlling said disk array; and
   an auxiliary memory device connected to said disk array and said array controller for temporarily storing data outside of said disk array when said data is being changed from said first RAID type to said second RAID type within said disk array, wherein said array controller writes said data to the first location as the first RAID type, transfers said data from the first location to the auxiliary memory, reallocates said first location from said first RAID type to said second RAID type while said data is temporarily stored in said auxiliary memory, and then writes said data back to the first location as the second RAID type.

2. The data storage device of claim 1, wherein said auxiliary memory device is a Random Access Memory (RAM) unit.

3. The data storage device of claim 1, wherein said first RAID type is RAID Type-1 and said second RAID type is RAID Type-5.

4. The data storage device of claim 1, wherein said auxiliary memory device is only used when said disk array reaches a predetermined level of data storage.

5. The data storage device of claim 1, wherein said disks of said disk array are allocated in stripes among different data storage types.

6. A method of changing a first set of data in a disk array from a first storage type to a second storage type, said method comprising:
   writing data to a first location of the first storage type;
   copying said data from the first location of said first storage type within said disk array to an auxiliary memory device;
   reallocating said first location from said first storage type to said second storage type after said data is copied to said auxiliary memory device; and
   copying said data from said auxiliary memory device back to said first location under said second storage type in order to change said data in said disk array from said first storage type to said second storage type, wherein copying said data from said auxiliary memory device back to said first location under said second storage type comprises rewriting said data from said auxiliary memory device to said first location within said disk array.

7. The method of claim 6, further comprising copying said data from said auxiliary memory devise to a second location of said second storage type within said disk array.

8. The method of claim 6, further comprising:
   evaluating a size of said first set of data relative to a granularity with which said array is allocated between said first and second storage types to produce an evaluation; and,
   in response to said evaluation, selectively reallocating said first location from said first storage type to said second storage type after said data is copied to said auxiliary memory device, wherein copying said data from said auxiliary memory device back to said disk array under said second storage type comprises copying said data from said auxiliary memory device to said first location within said disk array.

9. A method of changing a first set of data in a disk array from a first storage type to a second storage type, said method comprising:
   copying said data from a first location of said first storage type within said disk array to an auxiliary memory device;
   copying said data from said auxiliary memory device back to said disk array under said second storage type in order to change said data in said disk array from said first storage type to said second storage type;
   identifying a second set of data at a second location of said second storage type within said array, wherein said data can be changed from said second storage type to said first storage type;
   copying said second set of data to said auxiliary memory device;
   copying said second set of data to said first location within said array; and
   copying said first set of data to said second location within said array.

10. A method of balancing performance of a disk array, said method comprising:
    copying a first set of data from a first, actively used disk having a first RAID (Redundant Arrays of Independent Disks) storage type within said disk array to an auxiliary memory unit;
    copying a second set of data from a second, less actively used disk having a second RAID storage type within said disk array to said auxiliary memory device;
    copying said first set of data to said second disk to change said first set of data to said second RAID storage type; and
    copying said second set of data to said first disk to change said second set of data to said first RAID storage type.

11. A data storage device comprising:
    a data storage device including an array controller coupled to an array of independent disks with first plural disks storing data having a first RAID (Redundant Arrays of Independent Disks) type and second plural disks having a second RAID type; and
    an auxiliary memory device separate from, but in communication with said data storage device for receiving said data stored in the first plural disks so as to temporarily store said data outside said data storage device while said first plural disks are being changed from said first RAID type to said second RAID type within said data storage device, wherein said array controller reallocates said first plural disks from said first RAID type to said second RAID type while said data is temporarily stored in said auxiliary memory and then transfers said data back to the first plural disks having said second RAID type.

12. The data storage device of claim 11, wherein said auxiliary memory device is a RAM (Random Access Memory) unit.

13. The data storage device of claim 11, wherein said auxiliary memory device comprises any of a disk drive, a hard drive, a tape drive or semiconductor memory.

14. A system for changing a first set of data in a disk array from a first storage type to a second storage type, said system comprising:

means for copying said data from a first location of said first storage type within said disk array to an auxiliary memory means;

means for copying said data from said auxiliary memory means back to said disk array under said second storage type in order to change said data in said disk array from said first storage type to said second storage type;

means for identifying a second set of data at a second location of said second storage type within said array, wherein said data can be changed from said second storage type to said first storage type;

means for copying said second set of data to said auxiliary memory means;

means for copying said second set of data to said first location within said array; and means for copying said first set of data to said second location within said array.

15. The system of claim 14, further comprising means for reallocating said first location from said first storage type to said second storage type after said data is copied to said auxiliary memory means.

16. The system of claim 14, further comprising means for copying said data from said auxiliary memory means to a second location of said second storage type within said disk array.

17. The system of claim 14, further comprising:

means for evaluating a size of said first set of data relative to a granularity with which said array is allocated between said first and second storage types to produce an evaluation; and, in response to said evaluation, means for selectively reallocating said first location from said first storage type to said second storage type after said data is copied to said auxiliary memory means, wherein copying said data from said auxiliary memory means back to said disk array under said second storage type comprises copying said data from said auxiliary memory means to said first location within said disk array.

18. A data storage device comprising:

a disk array comprising a plurality of independent disks;

an array controller for controlling said disk array; and an auxiliary memory device in communication with said disk array and array controller;

wherein said device is configured to temporarily store data in said auxiliary memory from a first location in said disk array when said data is being changed from a first data storage type to a second data storage type within said disk array;

wherein said array controller evaluates a size of said data relative to a granularity with which said disk array is allocated between said first and second data storage types to produce an evaluation and, in response to said evaluation, selectively reallocates said first location from said first data storage type to said second data storage type after said data is copied to said auxiliary memory device, wherein copying said data from said auxiliary memory device back to said disk array under said second storage type comprises copying said data from said auxiliary memory device to said first location within said disk array.

19. The data storage device of claim 18, wherein said auxiliary memory device is a Random Access Memory (RAM) unit.

20. The data storage device of claim 18, wherein said first data storage type is Type-1 storage for Redundant Arrays of Independent Disks (RAID); and said second data storage type is (RAID) Type-5.

21. The data storage device of claim 18, wherein said auxiliary memory device is only used when said disk array reaches a predetermined level of data storage.

\* \* \* \* \*

UNITED STATES PATENT AND TRADEMARK OFFICE
CERTIFICATE OF CORRECTION

| | |
|---|---|
| PATENT NO. | : 7,383,379 B2 |
| APPLICATION NO. | : 10/214685 |
| DATED | : June 3, 2008 |
| INVENTOR(S) | : Brian L Patterson et al. |

It is certified that error appears in the above-identified patent and that said Letters Patent is hereby corrected as shown below:

In column 7, line 66, in Claim 7, delete "devise" and insert -- device --, therefor.

Signed and Sealed this

Eleventh Day of November, 2008

JON W. DUDAS
*Director of the United States Patent and Trademark Office*